US009515935B2

(12) United States Patent
Bhikkaji et al.

(10) Patent No.: US 9,515,935 B2
(45) Date of Patent: Dec. 6, 2016

(54) VXLAN BASED MULTICASTING SYSTEMS HAVING IMPROVED LOAD DISTRIBUTION

(71) Applicant: DELL PRODUCTS L.P., Round Rock, TX (US)

(72) Inventors: Bhargav Bhikkaji, San Jose, CA (US); Balaji Venkat Venkataswami, Tamilnadu (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 14/681,788

(22) Filed: Apr. 8, 2015

(65) Prior Publication Data
US 2015/0215211 A1 Jul. 30, 2015

Related U.S. Application Data

(63) Continuation of application No. 13/907,762, filed on May 31, 2013, now Pat. No. 9,014,007.

(51) Int. Cl.
| | |
|---|---|
| *H04L 12/803* | (2013.01) |
| *H04L 12/707* | (2013.01) |
| *H04L 12/18* | (2006.01) |
| *H04L 12/725* | (2013.01) |
| *H04L 12/713* | (2013.01) |

(52) U.S. Cl.
CPC ............ *H04L 47/125* (2013.01); *H04L 12/189* (2013.01); *H04L 45/24* (2013.01); *H04L 45/30* (2013.01); *H04L 45/586* (2013.01)

(58) Field of Classification Search
CPC .................................................... H04L 47/125
USPC ......................................................... 370/237
See application file for complete search history.

(56) References Cited

U.S. PATENT DOCUMENTS

| | | | | |
|---|---|---|---|---|
| 6,523,069 B1 * | 2/2003 | Luczycki | ............ | H04L 12/2856 709/249 |
| 6,980,548 B1 * | 12/2005 | Zaccone | ............. | H04L 12/1886 370/389 |
| 7,835,301 B1 * | 11/2010 | Maufer | ................. | H04W 24/02 370/254 |
| 8,699,486 B1 * | 4/2014 | Luo | ......................... | H04L 12/18 370/351 |
| 2007/0177525 A1 * | 8/2007 | Wijnands | ................ | H04L 12/18 370/254 |
| 2007/0177594 A1 * | 8/2007 | Kompella | ............. | H04L 12/185 370/390 |

(Continued)

OTHER PUBLICATIONS

IETF RFC5015, Oct. 2007.

*Primary Examiner* — Mark Rinehart
*Assistant Examiner* — Peter Solinsky
(74) *Attorney, Agent, or Firm* — Haynes and Boone, LLP

(57) ABSTRACT

A virtual extensible local area network ("VXLAN") system includes servers having VXLAN tunnel end points ("VTEP") and virtual machines ("VMs"), multiple routers to transmit network data using bidirectional groups ("BIDIRs") and rendezvous points ("RPs"), and an associated management and provisioning entity ("MPE") adapted to arrange BIDIRs dynamically based upon network traffic such that traffic is more evenly distributed across the VXLAN. Some of the routers can be preconfigured as potential RPs, and the MPE can activate and deactivate these routers to and from RP status as needed. The MPE creates and rearranges BIDIRs based upon volume thresholds of traffic being reached in BIDIRs, such as by splitting overloaded BIDIRs. Network traffic can be monitored by VTEPs and RPs.

19 Claims, 3 Drawing Sheets

(56) References Cited

U.S. PATENT DOCUMENTS

| | | | |
|---|---|---|---|
| 2009/0180400 A1* | 7/2009 | Chiabaut | H04L 12/462 370/255 |
| 2009/0190478 A1* | 7/2009 | Li | H04L 45/02 370/238 |
| 2011/0134918 A1* | 6/2011 | Field | H04L 12/1868 370/390 |
| 2012/0324441 A1* | 12/2012 | Gulati | G06F 9/5088 718/1 |
| 2013/0064244 A1* | 3/2013 | Sathappan | H04L 12/18 370/390 |
| 2013/0227166 A1* | 8/2013 | Ravindran | H04L 67/327 709/238 |
| 2013/0250951 A1* | 9/2013 | Koganti | H04L 49/356 370/390 |
| 2013/0329605 A1 | 12/2013 | Nakil et al. | |
| 2014/0050091 A1 | 2/2014 | Biswas et al. | |
| 2014/0086253 A1 | 3/2014 | Yong | |
| 2014/0195666 A1 | 7/2014 | Dumitriu et al. | |
| 2014/0254603 A1 | 9/2014 | Banavalikar et al. | |
| 2014/0258485 A1 | 9/2014 | Yang et al. | |
| 2014/0269311 A1 | 9/2014 | Srinivasan et al. | |
| 2014/0269328 A1* | 9/2014 | Venkataswami | H04L 12/18 370/238 |
| 2014/0269709 A1 | 9/2014 | Benny et al. | |
| 2014/0269733 A1 | 9/2014 | Venkatesh | |
| 2014/0310362 A1 | 10/2014 | Babu et al. | |
| 2015/0098318 A1* | 4/2015 | Gooch | H04L 12/462 370/228 |
| 2015/0124654 A1* | 5/2015 | Pani | H04L 12/18 370/256 |

* cited by examiner

VXLAN BASED MULTICASTING SYSTEMS HAVING IMPROVED LOAD DISTRIBUTION

CROSS REFERENCE TO RELATED APPLICATIONS

This application is a continuation of U.S. patent application Ser. No. 13/907,762 filed on May 31, 2013, the full disclosure of which is incorporated by reference herein in its entirety and for all purposes.

TECHNICAL FIELD

The present invention relates generally to data communication networks, and more particularly to data communication networks that involve multicast streams on virtual networks or portions thereof.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information, and may include one or more computer systems, data storage systems, and networking systems.

Advances in server virtualization have placed increased demands on physical network infrastructures. For example, there can be a need for more Media Access Control ("MAC") address table entries throughout a switched network due to the potential attachment of hundreds upon thousands of Virtual Machines ("VMs"), each having its own separate MAC address. Also, VMs may be grouped according to their Virtual Local Area Network ("VLAN"), where thousands of VLANs might be needed in a given data center in order to partition traffic properly. The current VLAN limit of 4094 can be inadequate in some situations. In response to these and other problems that arise through continuing server virtualization, protocols and framework for a virtual extensible local area network ("VXLAN") have been proposed.

In general, a VXLAN is a protocol for running an overlay network on an existing infrastructure for Layer 3 ("L3") (i.e., a network layer), such that a virtual network is built to support elastic compute architectures. In essence, a VXLAN can connect multiple L3 networks and make them appear to share the same Layer 2 ("L2") domain. This allows VMs to reside in different networks and yet still operate as if they belong to the same L2. This is generally accomplished through the use of particular VXLAN-based network structuring, identifying, addressing and encapsulating, among other modifications to traditional VLAN systems. In effect, VXLAN can be considered a tunneling scheme with VM hosts (e.g., ESX hosts) or "hypervisors" that are VXLAN Tunnel End Points ("VTEPs"). Other details of VXLAN can be found at, for example, the Internet website http://datatracker.ietf.org/doc/draft-mahalingam-dutt-dcops-vxlan/, which is incorporated by reference herein for this purpose.

The introduction of such VXLAN solutions to the various foregoing problems, however, can result in further issues with respect to such new solutions and protocols. One problem can involve issues that arise when separate multicast trees are provided for one, more, or all tenants on a VXLAN. Another problem can involve issues that arise when separate multicast trees are provided for each multicast stream within a given tenant. In these and other instances, an excessive concentration of traffic on relatively few links across the VXLAN can present a real problem in operating the VXLAN effectively.

Although many systems and methods for providing server virtualization have generally worked well in the past, there is always a desire for improvement. In particular, what is desired are systems and methods that are able to take the tendency of network traffic to concentrate on only a few network links and distribute the overall load of traffic effectively across an entire VXLAN topology instead.

SUMMARY

It can be an advantage of the present invention to provide improved information handling systems and methods that utilize VXLAN environments to multicast effectively by distributing traffic loads more evenly across the network. This can be accomplished by preconfiguring numerous potential Rendezvous Points ("RPs") across the network topology, monitoring network traffic at active RPs, and rearranging or creating new bidirectional groups ("BIDIRs") or trees in response to traffic thresholds being reached at any given RP.

In various embodiments of the present invention, a VXLAN system can include a plurality of servers, each having a VXLAN tunnel end point ("VTEP") and a plurality of VMs thereupon. The VXLAN system can include various routers and/or switches coupled to the servers, with each such router or switch being adapted to facilitate the transmittal of network data between the plurality of servers therethrough according to designated BIDIRs having designated VMs thereupon. Multiple of said plurality of routers can be preconfigured as potential RPs for BIDIRs. The VXLAN system can also include a processor coupled to the plurality of routers, the processor having a management and provisioning entity ("MPE") located thereupon. The MPE can be adapted to arrange BIDIRs dynamically based upon traffic passing through the plurality of routers such that traffic is more evenly distributed across the VXLAN.

In various detailed embodiments, the MPE is adapted to facilitate the rearrangement of an existing BIDIR, such as based upon a volume threshold of traffic being reached in the BIDIR. The MPE can be adapted to facilitate the rearrangement of the existing BIDIR by creating a new BIDIR and facilitating moving one or more of the designated VMs from the existing BIDIR to the new BIDIR. This can involve moving designated VMs by causing affected VTEPs to send Internet Group Management Protocol ("IGMP") join requests to the new BIDIR and IGMP leave requests to the existing BIDIR. In some embodiments, the RPs are adapted to monitor traffic passing therethrough. Also, the RPs can be adapted to send notices to the MPE when a volume threshold of traffic is reached. One or more of the routers that are preconfigured as potential RPs may not act as RPs unless the MPE has designated them as an RP. Also, traffic passing through the plurality of routers can be multicasting traffic.

In various further embodiments, a computing system adapted to manage a VXLAN can include a processor adapted to couple to and manage a plurality of VXLAN routers, servers, BIDIRs, VMs, RPs, VTEPs and the like, as well as one or more software modules adapted to be executed with respect to the processor. The module(s) can contain computer code for an MPE that is adapted to arrange BIDIRs dynamically based upon traffic passing through the routers such that traffic is more evenly distributed across the VXLAN. Again, the MPE can be adapted to facilitate the rearrangement of an existing BIDIR based upon a volume threshold of traffic being reached in the BIDIR. Other details of the processor and MPE can be similar to those for the full system embodiment above.

In still further embodiments, various methods of distributing multicasting load across a VXLAN can be provided. Such methods can include the process steps of preconfiguring a plurality of VXLAN routers as potential RPs, establishing one or more BIDIRs having designated VMs and activated RPs thereupon, monitoring network traffic at the activated RPs, determining that a traffic threshold has been reached at an activated RP within a given BIDIR, and removing one or more tenants from the given BIDIR and placing said one or more tenants into a different BIDIR. In some embodiments, the different BIDIR can be a newly established BIDIR in response to the determination that a traffic threshold has been reached. In addition, the activated RP can send a message to a management and provisioning entity ("MPE") that the traffic threshold has been reached.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive multicasting, load considering, and VXLAN-based data network devices, systems and methods. These drawings in no way limit any changes in form and detail that may be made to the invention by one skilled in the art without departing from the spirit and scope of the invention.

DETAILED DESCRIPTION

Figure 1:
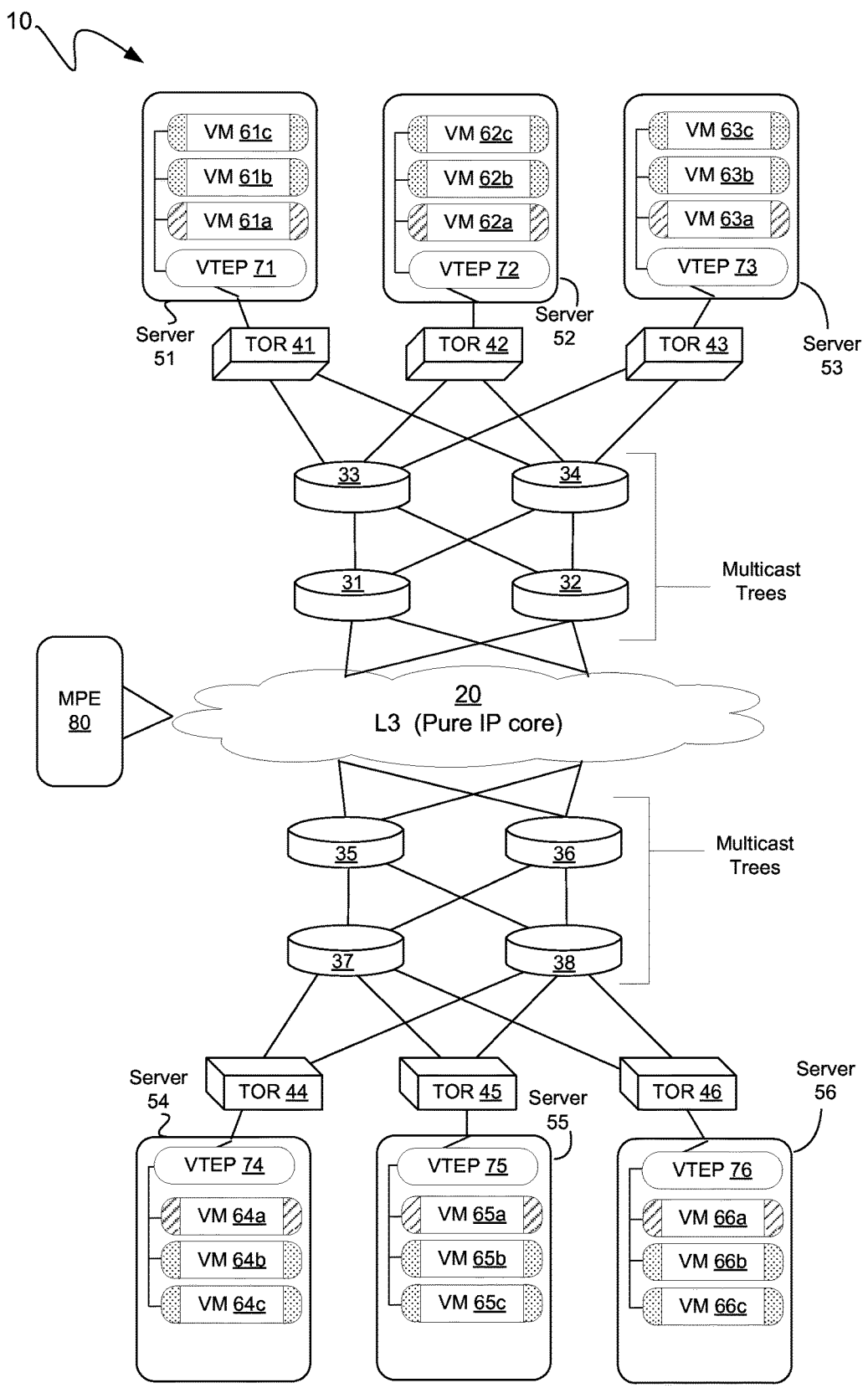
FIG. 1 illustrates in block diagram format the layout of an exemplary VXLAN system according to one embodiment of the present invention.

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting. In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

For purposes of this disclosure, an information handling system may include an instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device, and may vary in size, shape, performance, functionality and price. The information handling system may include random access memory ("RAM"), one or more processing resources such as a central processing unit ("CPU") or hardware or software control logic, read only memory ("ROM"), and/or other types of nonvolatile memory. Additional components of the information handling system may include one or more disk drives, one or more network ports for communicating with external devices, as well as various input and output ("I/O") devices, such as a keyboard, a mouse, and a video display. The information handling system may also include one or more buses operable to transmit communications between the various hardware components.

The present invention relates in various embodiments to devices, systems and methods involving information handling systems. In particular embodiments, the subject information handling devices, systems or methods utilize data centers and associated components that are adapted to multicast over VXLAN environments and systems. In addition, various software and firmware components can be included with the subject VXLAN based multicasting systems. A wide variety of software protocols, platforms and programs can be used, and it is specifically contemplated that any suitable protocol, platform or program can be used with the systems and methods set forth herein. As specific non-limiting examples, Management and Provisioning Entity ("MPE") software components such as the VMControlCenter software system can be used, among other possibilities.

In various embodiments, one or more subject software infrastructures, programs or modules can provide for the specific reservation, distribution, adjustment and/or reassignment of interlink or fabric bandwidth, traffic or load. Such reservation, distribution, adjustment and/or reassignment can be initially determined as may be appropriate for start multicasting needs and parameters, and then adjusted dynamically as needs change over time. Various methods for determining and managing such dynamic changes in load distribution over a VXLAN can include the use of congruent thresholds and utilization thresholds while monitoring overall traffic in order to create and restructure groups and trees in real time, and thereby shift or otherwise alter load patterns and paths as needed.

In general, the disclosed VXLAN L3 multicast arrangements can be adapted to maintain as few multicast forwarding entries (i.e., (*, G)) as possible at the system core, while distributing the multicast traffic streams evenly over the topology of the full network. This can avoid overstressing or overreliance on some links while underutilizing others. This can be accomplished in part by dynamically using an MPE to assign OuterGroup addresses to the VTEPs, and by using a respective tenant to assign InnerGroup addresses to the VMs. In such arrangements, the transport multicast encapsulation can then be (OuterGroup, InnerGroup). Monitoring traffic, establishing new trees or groupings, and changing multicast groupings in real time as may be appropriate can then help to balance loads. This can also involve spawning new trees when volume thresholds are reached. The creation and/or adjustment of such trees can involve the use of "phantom" Rendezvous Points ("RPs") for existing and newly created bidirectional ("BIDIR") groups, with the RPs being chosen and placed in such a manner so as to stream multicast traffic through different parts of the network topology.

There can be several significant advantages to such a VXLAN arrangement. For one thing, the multicast states can be minimized in the network core, which allows for greater overall flexibility and speed in the network. In addition, the dynamic establishment, distribution and adjustment of trees and groups results in utilizing many or all links through the system in a more even and distributed manner, such that particular links or chains are not overloaded and localized traffic congestion does not take place. Further, the techniques for assigning BIDIR trees to VTEPs can be the same or similar to that which is already proposed for VXLAN, such that implementing the arrangements and methods disclosed herein is not overly burdensome.

Turning first to FIG. 1, an exemplary VXLAN topology is illustrated in block diagram format. VXLAN 10 includes a pure IP core 20 at the network layer (L3). Numerous interconnected network switches and routers 31-38 coupled to the core 20 provide for a wide variety of possible multicast trees that can route multicast traffic to various Top of Rack switches ("TORs") 41-46. It will be readily appreciated that a plurality of switches/routers 31-38 can be configured as RPs for VXLAN 10. While only 8 network switches/routers and 6 TORs are shown for purposes of simplicity, it will be readily appreciated that many multiples of each of these types of switches can be present across a given VXLAN. Each given TOR 41-46 can be coupled to a respective server or host 51-56, each of which can contain a VTEP 71-76 and one or more associated VMs 61a-66c. Again, there can be many more servers and VTEPs than the several shown, and each server can contain dozens, hundreds or more separate VMs, as will be readily appreciated. In various embodiments, one or more servers 51-56 can be actual physical servers at the L2 level, which are all then interconnected at the L3 level over VXLAN 10. Various tenants can be formed within or across servers 51-56, as will be readily appreciated. In addition, an MPE 80 can be a software module or component that is resident on a processor or other computing system coupled to the network, with the MPE being adapted to label and manage group and tree formation.

Figure 2A:
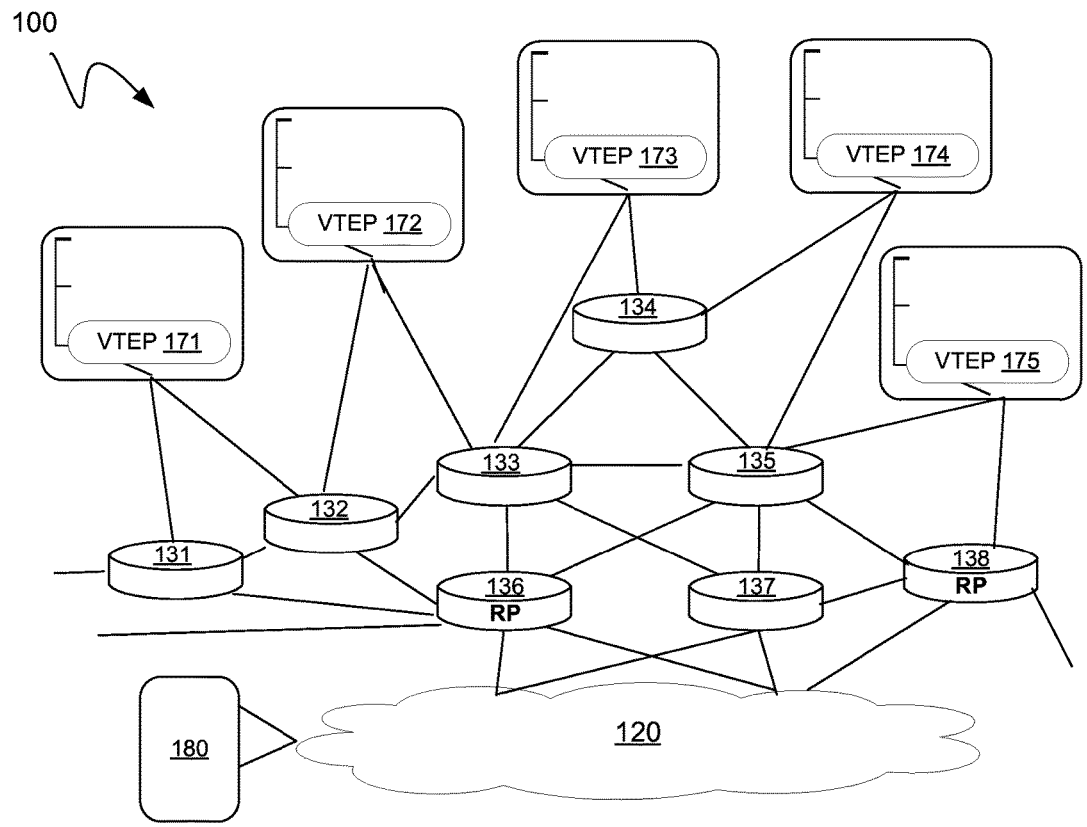
FIG. 2A illustrates in block diagram format the layout of another exemplary VXLAN topology according to one embodiment of the present invention.

Continuing with FIG. 2A, an exemplary VXLAN topology according to one embodiment of the present invention is illustrated in block diagram format. VXLAN 100 can be substantially similar to VXLAN 10, in that it includes a pure IP core 120 at the network layer (L3), various interconnected network switches and routers 131-138 coupled to the core 120 to provide for a wide variety of possible multicast trees that can route multicast traffic, various hosts each having a VTEP 171-175 and associated VMs, as well as an MPE 180 on an associated processor to label and manage group and tree formation. Similar to the foregoing example, it will be readily appreciated that many more switches, routers, hosts, VTEPs, VMs and the like can be present in VXLAN 100, as represented by various unresolved links extending from routers 131, 136, 138, and that the limited amount depicted are for purposes of illustration only.

One notable feature of VXLAN 100 is that a plurality of routers can be preconfigured as potential RPs, such as RPs 136 and 138. In fact, the overall topology of VXLAN can be structured so that a full amount of suitable potential RPs 136, 138 are preconfigured and ready for use as such. In one embodiment, the amount and distribution of preconfigured potential RPs can be designed with the maximum possible loads over the VXLAN in mind. As the VXLAN is used in practice though, not all of the preconfigured potential RPs are actually used as such. Rather, the use of one or more of the preconfigured potential RPs can depend upon whether such use is actually required for a given load. For example, in the components depicted in FIG. 2A, light network traffic across the shown links might result in only router 136 being needed as an RP at that time. In such case, router 138 would not act as an RP. In the event of significantly increased loads though, then the overall system could activate the RP abilities of router 138 such that both of routers 136 and 138 act as RPs. Deactivation of one or more RPs from that mode can then also take place as traffic or loads decrease across the pertinent links.

A determination as to whether one or more preconfigured potential RPs that are not currently acting as RPs should be activated as such can depend upon the dynamically changing traffic and loads across VXLAN 100. For example, a given BIDIR might have traffic across it increase substantially, such that it may be desirable to distribute the load for this BIDIR. In such cases, some or all of the BIDIR can be split, reworked, or otherwise have various links and paths reassigned. This can involve the creation of new BIDIRs with newly designated RPs, which RPs are selected from inactive preconfigured potential RPs. Such changes can take place as a result of a traffic threshold being reached across any given BIDIR.

Such a traffic threshold can be a "congruent threshold," which can represent an amount of traffic beyond which is undesirable for a given BIDIR. In some embodiments, the congruent threshold can relate to an amount of non-intersecting VTEPs among the various tenants under current consideration in a BIDIR. As one non-limiting particular example, for a given congruent threshold of 90%, there might be permitted only 10% of non-intersecting VTEPs among a particular group of grouped BIFIR trees that use the same OuterGroup multicast tree. One might also set an in-congruency threshold of 10%, indicating that the group of BIDIR trees grouped together should have at least 90% of intersecting BIDIR OuterGroup trees. Such a traffic threshold or "congruent threshold" can have configurable values, which may be set as desired by a given VXLAN designer or operator.

Figure 2B:
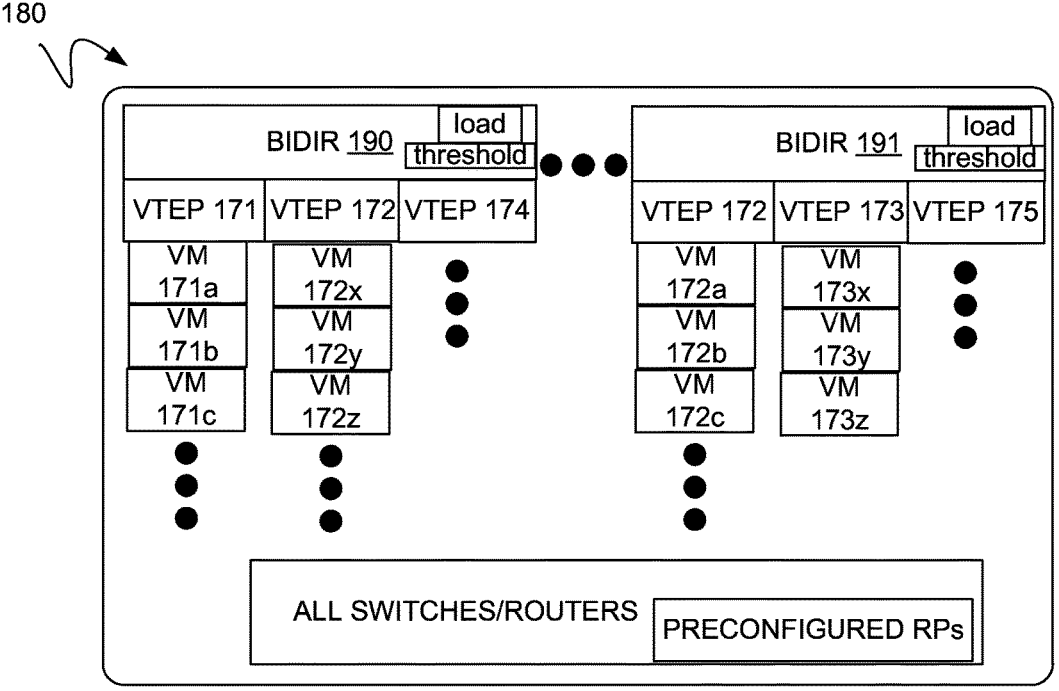
FIG. 2B illustrates in block diagram format an exemplary Management and Provisioning Entity ("MPE") according to one embodiment of the present invention.

Moving next to FIG. 2B, an exemplary MPE according to one embodiment of the present invention is illustrated in block diagram format. MPE 180 can be present within VXLAN 100 of FIG. 2A, and as such operates to assign, maintain, monitor traffic on and rearrange the various groups and trees across the VXLAN. As such, MPE 180 can include specific mappings or tables for all of the currently designated and operating BIDIR groups on VXLAN 100. For example, MPE 180 can have data regarding BIDIR 190 and BIDIR 191, which includes all VTEPs that are in each respective BIDIR and all VMs from each VTEP that are in that particular BIDIR. Although only two BIDIRs are shown, it will be readily appreciated that many more can be present at a given time.

In addition to having data regarding all of the members of each active BIDIR, MPE 180 can also have data on each BIDIR with respect to the present load across the BIDIR as well as the threshold value before reassignment and redistribution of load will take place. Further, MPE 180 can also contain data regarding all switches and routers throughout the VXLAN 100, as well as those that are preconfigured as potential RPs, as shown. In this manner, the MPE is able to select an appropriate RP when one or more new BIDIR groups are to be created due to increased network traffic reaching a traffic threshold on a given BIDIR.

Figure 3:
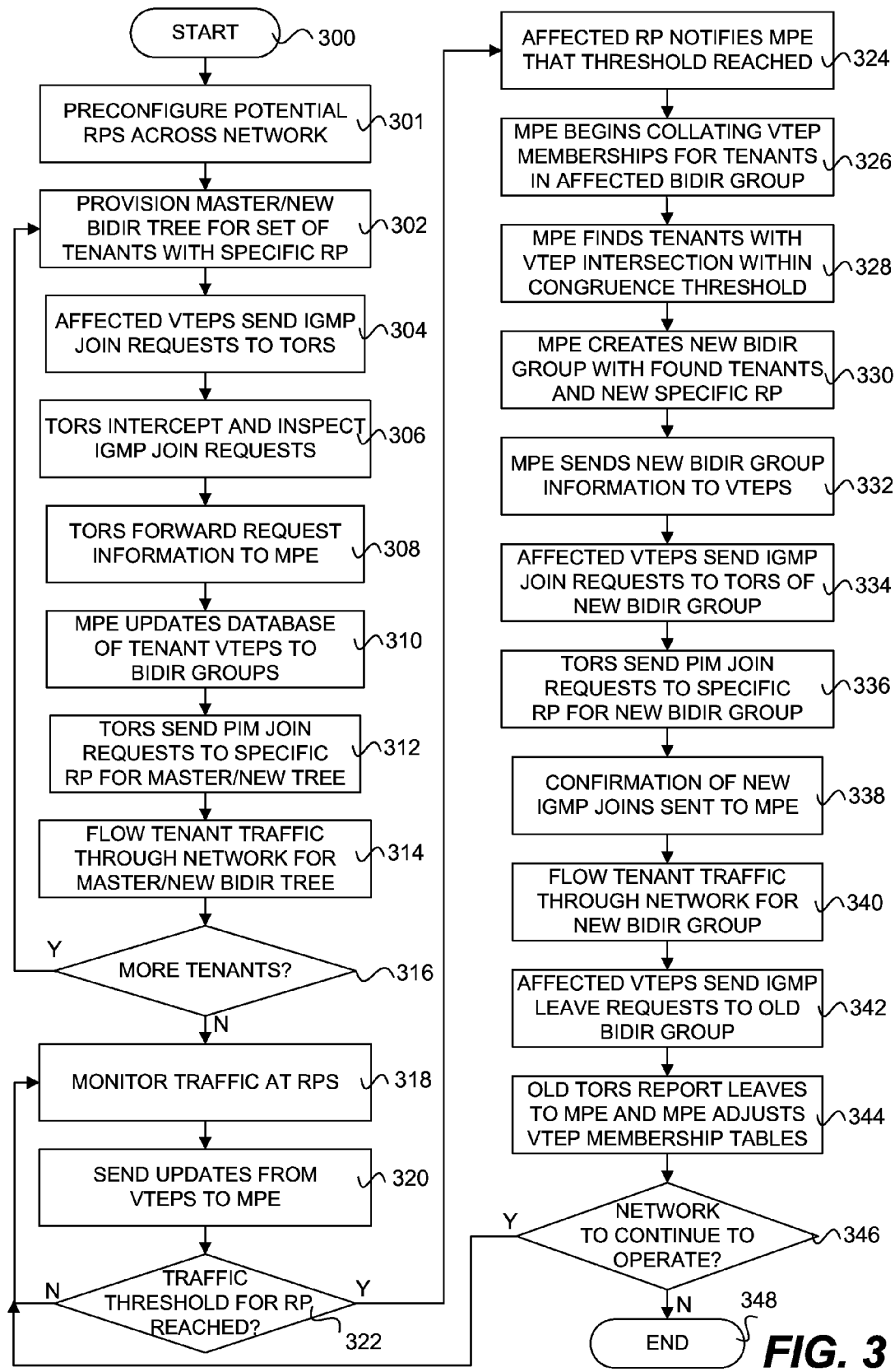
FIG. 3 provides a flowchart of an exemplary method of distributing multicast load across a VXLAN according to one embodiment of the present invention.

Although a wide variety of applications involving efficiently distributing multicasting load across a VXLAN using the foregoing systems can be envisioned, one basic method is provided here as an example. Turning next to FIG. 3A, a flowchart of an exemplary method of distributing multicast load across a VXLAN is provided. In particular, such a method can involve efficiently using or operating an MPE or other suitable computing module or system, in association with a VXLAN, such that VTEP groups, BIDIR trees and RPs are optimally created and altered in response to multicast loads over the network. It will be readily appreciated that not every method step set forth in this flowchart is always necessary, and that further steps not set forth herein may also be included. For example, added steps to set or designate congruent and/or utilization thresholds can be included. Furthermore, the exact order of steps may be altered as desired for various applications.

Beginning with a start step 300, a first process step 301 can involve preconfiguring various routers as potential RPs across the VXLAN topology. This does not necessarily involve activating all of the potential RPs as active RPs, but only configures them as such in the event that they become needed as RPs at a later time. A subsequent process step 302 can involve a VMControlCenter module or other suitable MPE initially provisioning or establishing a single master BIDIR tree for a set of tenants with a specific RP. This can involve activating the RP from a potential to an active RP state. In various embodiments, the RP can be a "phantom" RP.

The various VTEPs over the network can then send Internet Group Management Protocol ("IGMP") join requests to their respective TORs at the next process step 304. At subsequent process step 306, the TORs intercept and inspect the sent IGMP join requests, after which the TORs forward information to the MPE regarding which associated VTEPs are joining which BIDIR groups and for which tenants at process step 308. As will be readily appreciated, a single VTEP can be part of multiple tenants, since they may instantiate VMs belonging to different tenants.

At subsequent process step 310, the MPE can then maintain or update a database that contains the mapping of VTEPs of a tenant to the master BIDIR multicast group assigned. After this is done, the TORs can then send respective Protocol Independent Multicast ("PIM") join requests to the specific RP assigned to the single master BIDIR tree at process step 312, such that the multicast forwarding entry states (*,G) are instantiated. Traffic can then flow through the transport network for the established set of tenants through the provisioned master BIDIR group at process step 314. At decision step 316, an inquiry can then be made as to whether further tenants need to be registered. If so, then steps 302 through 316 are repeated for each new set of tenants, and additional new BIDIR trees with specific RPs are provisioned for each different tenant set. For example, if there are 1000 tenants, then subsets of 100 tenants each could be assigned to a given BIDIR tree and specific RP. Of course, other amounts of tenants and divisions are also possible.

As all tenants are established with BIDIR groups and specific RPs, traffic is then monitored over the network by the various RPs at process step 318. Traffic can be monitored at the various RPs, which again can be phantom-like RPs, as well as at the various VTEPs by specially configured VM applications. The specially configured VM applications can utilize information that is naturally held by the VTEP, such as VM group statistics regarding how much local traffic is traveling on the respective inner VM groups. Specially configured VM applications to monitor inner VM traffic within a VTEP can be placed based on the congruence of inner VM group membership by the MPE. The VTEPs can then update the MPE about the inner VM group traffic periodically at process step 320.

While traffic is monitored, inquiries can be made as to whether a threshold has been reached at decision step 322. If no threshold has been reached, then the method reverts to step 318. When a traffic threshold has been reached, however, then the method continues to process step 324, where the affected RP notifies the MPE that the affected link utilization has reached or crossed a given threshold. Such a notification can be made by an out-of-band mechanism, such as a Transmission Control Protocol ("TCP") connection, for example, from the RP to the MPE. Updates and/or notices from the VTEPs to the MPE can also be by way of the same or other out-of-band mechanisms. Other suitable communication techniques may also be used.

Upon receiving the threshold reached notification, the MPE then begins to collate memberships of the VTEPs for all tenants in the affected BIDIR group at process step 326. At process step 328, this can involve the MPE finding the tenants having interested VTEPs that form an intersection amongst each other such that they fall within a "congruent threshold." Again, the congruent threshold can be a configurable value, and can represent the amount of non-intersecting VTEPs among the various tenants under current consideration. At a subsequent process step 330, the MPE can then create a new BIDIR group with the tenants found in step 328, as well as a new RP. This can involve activating a preconfigured potential RP from deactivated to an active state. The new RP is preferably selected based upon existing network traffic, such that the actual new RP is less utilized than other potential new RPs. Upon creating the new BIDIR group, the MPE can then send the new BIDIR group information to affected VTEPs at process step 332.

Upon receipt of such information, the affected VTEPs can then send IGMP join requests to the TORs for their new BIDIR group at process step 334. The TORs then send PIM join requests to the new RP for the new BIDIR group at process step 336 and confirmation of these new IGMP joins is then sent to the MPE at process step 338. New tenant traffic is then flowed through the network for the new BIDIR group at process step 340. The affected VTEPs can then send IGMP leave requests to their old BIDIR group at process step 342, upon which the VTEPs are then removed from such old groups. The old TORs report the leave requests to the MPE and the MPE adjusts its VTEP membership tables to reflect the new membership statuses at process step 344.

The method then continues to a decision step 346, where an inquiry is made as to whether the network is to continue to operate. If so, then the method reverts to process step 318, where traffic is monitored at the RPs. If the network is to cease operation here, or at any time, however, then method proceeds to finish at end step 348.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A computing system comprising:
   a processor adapted to manage a plurality of routers, the plurality of routers being coupled to a plurality of servers, wherein each of said routers is adapted to facilitate network data communication among the plurality of servers according to multicast trees; and
   one or more modules adapted to be executed with respect to said processor, said one or more modules being configured to:
   dynamically select one or more active rendezvous points ("RPs") for the multicast trees from among the routers that are potential RPs for the multicast trees so as to balance loads associated with the network data communication; and
   receive information on traffic passing through the one or more active RPs.

2. The computing system of claim 1, wherein the one or more modules are adapted to facilitate the rearrangement of an existing multicast tree.

3. The computing system of claim 2, wherein the one or more modules are adapted to facilitate the rearrangement of the existing multicast tree based upon a volume threshold of traffic in the existing multicast tree.

4. The computing system of claim 1, wherein the one or more modules are adapted to receive a notification when a volume threshold of traffic is reached in one of the active RPs.

5. The computing system of claim 1, wherein each of said potential RPs do not act as RPs unless the one or more modules have designated them as an RP.

6. The computing system of claim 1, wherein said traffic passing through said one or more active RPs comprises multicasting traffic.

7. The computing system of claim 1, wherein each server includes a VXLAN tunnel end point ("VTEP") and a plurality of virtual machines ("VMs") thereupon.

8. The computing system of claim 7, wherein the multicast trees are configured as bidirectional groups ("BIDIRs") having designated VMs thereupon.

9. An information handling system comprising:
   a plurality of servers; and
   a plurality of routers coupled to said servers, each router being adapted to facilitate network data communication among the plurality of servers according to multicast trees, wherein more than one of said plurality of routers are configured as potential rendezvous points ("RPs") for the multicast trees;
   wherein one or more active RPs are dynamically selected from the potential RPs to balance loads in the information handling system.

10. The information handling system of claim 9, wherein existing multicast trees are rearranged based upon a volume threshold of traffic being reached in the existing multicast trees.

11. The information handling system of claim 9, wherein existing multicast trees are rearranged by creating a new multicast tree and moving traffic from the one of the existing multicast trees to the new multicast tree.

12. The information handling system of claim 9, wherein the active RPs send notices when a volume threshold of traffic is reached through the active RPs.

13. The information handling system of claim 9, wherein a module contains information regarding which routers are configured as the potential RPs.

14. The information handling system of claim 9, wherein traffic passing through said plurality of routers comprises multicasting traffic.

15. The information handling system of claim 9, wherein each of said more than one routers that are configured as potential RPs do not act as RPs unless one or more modules have designated them as an RP.

16. The information handling system of claim 9, wherein each server includes a VXLAN tunnel end point ("VTEP") and a plurality of virtual machines ("VMs") thereupon, and wherein the multicast trees are configured as bidirectional groups ("BIDIRs") having designated VMs thereupon.

17. A method of distributing a multicasting load across a network, the method comprising:
   preconfiguring a plurality of routers as potential rendezvous points ("RPs");
   establishing one or more multicast trees having designated activated RPs;
   monitoring network traffic at the activated RPs;
   determining that a traffic threshold has been reached at a first activated RP within a given multicast tree; and
   removing one or more tenants from the given multicast tree and placing said one or more tenants into a different multicast tree.

18. The method of claim 17, wherein the different multicast tree is a newly established multicast tree in response to the determination that the traffic threshold has been reached.

19. The method of claim 17, further comprising receiving a message from the first activated RP that the traffic threshold has been reached.

* * * * *